Dec. 4, 1934.  R. WHITFORD  1,983,203

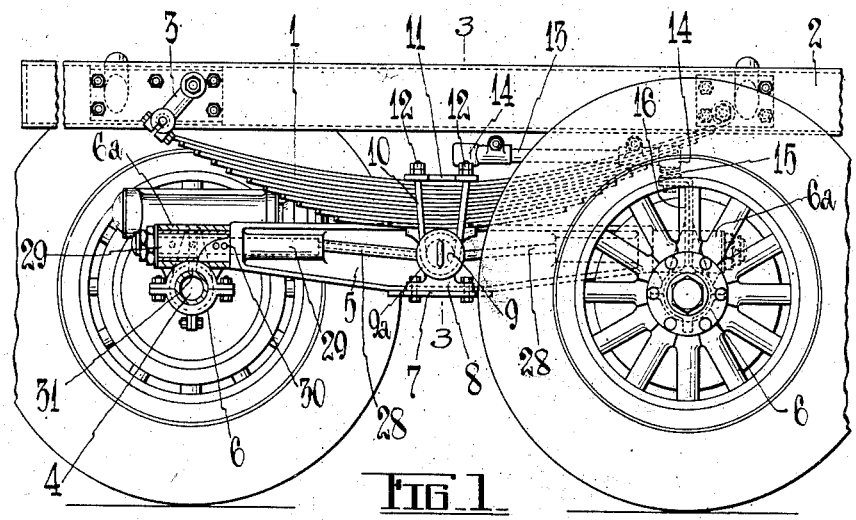

FLEXIBLE FOUR WHEEL DRIVE FOR MOTOR VEHICLES

Filed March 2, 1933  2 Sheets-Sheet 2

R. Whitford
INVENTOR

By: Marks & Clark
ATTYS.

Patented Dec. 4, 1934

1,983,203

UNITED STATES PATENT OFFICE 1,983,203

FLEXIBLE FOUR WHEEL DRIVE FOR MOTOR VEHICLES

Richard Whitford, Palmerston North, New Zealand

Application March 2, 1933, Serial No. 659,430
In New Zealand March 3, 1932

4 Claims. (Cl. 180—22)

This invention relates to the mounting of the power driven wheels of motor vehicles where more than a pair of power driven wheels is employed, and has for its object the provision of an improved form of mounting designed to be flexible at all angles so as to ensure all of the power driven wheels remaining on the ground and being utilized to propel the vehicle, while eliminating strains and stresses due to the displacement from normal of one or more of the driven wheels.

According to the invention, the axle housings of the power driven wheels of a motor vehicle equipped with a plurality of pairs of power driven wheels are connected together by beams, secured to said housings by universal bearings, said beams in turn being secured to the vehicle frame, or to the springs attached thereto, so as to be capable of pivoting about a horizontal axis.

In order to neutralize the tendency of the axle housings to turn, torque rods are fitted between the front housing and fixtures on the vehicle, while a telescopic torque tube is fitted between the housings, said tube accommodating the drive shaft between the power driven axles.

Provision is made for lubrication of the various bearings by incorporating in the mounting, lubricant reservoirs equipped with hand operated plungers by means of which lubricant can be forced through ducts or passages to the working parts.

Figure 3:
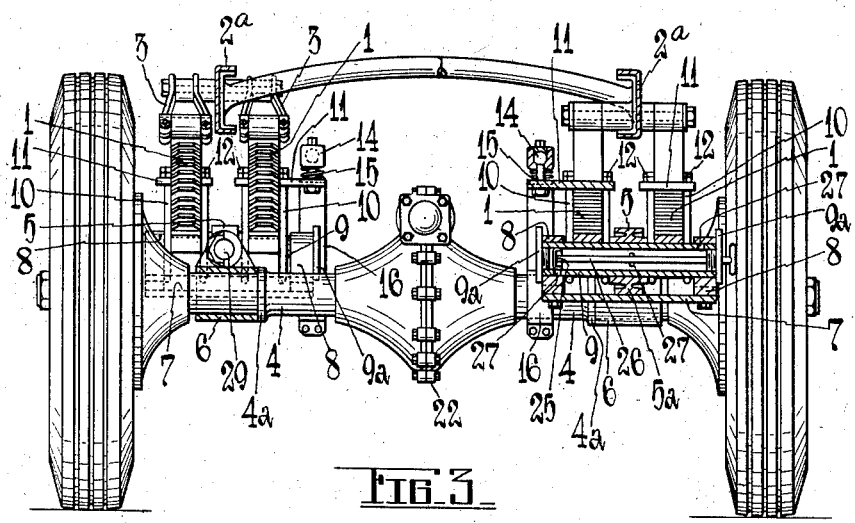
Figure 4:
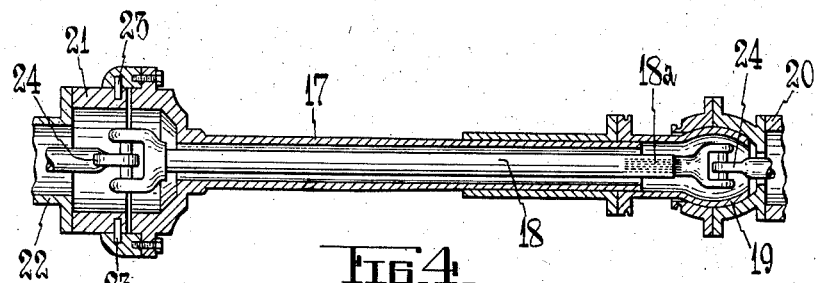
Figure 5:
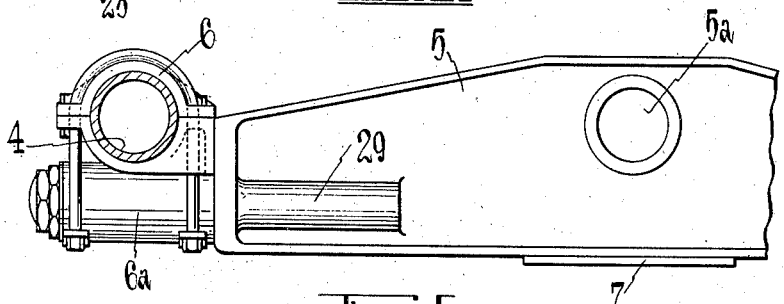
Figure 6:
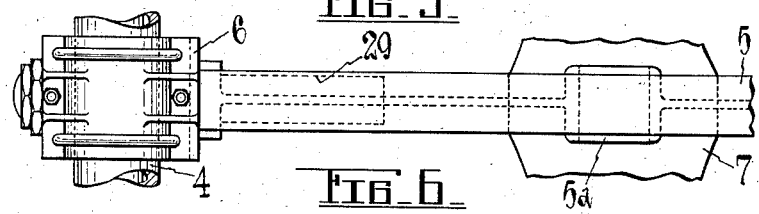

Referring to the accompanying drawings, in conjunction with which the invention will be more particularly described, Figure 1 is a part side view and part sectional view of a chassis, the four rear wheels of which are equipped with a drive according to the invention, while Figure 2 is a plan view of the parts shown in Figure 1, with the chassis frame and springs removed from one side, and Figure 3 is a part rear elevational and part cross sectional elevation on the line 3—3 Figure 1:

Figure 4 is a view in longitudinal section of the torque tube used between the axle housings, and Figures 5 and 6 are a part elevation and part plan view respectively of an alternative form of bearing mounting.

In carrying out the invention, leaf springs 1 are fitted to the chassis 2, one at each side of each longitudinal member 2a thereof, said springs 1 being connected at their rear ends to hangers 3 secured to the chassis members, and at their front ends being attached directly to said chassis members.

The axle housings 4 are connected together at each side of the vehicle by beams 5 extending lengthways thereof between the springs 1 at the same side of the vehicle.

Secured on the axle housings 4 one at each end of each connecting beam 5, is a universal bearing 6, 6a, formed and fitted to the housing so that the latter is turnable in the lower portion 6 of the bearing in a direction fore and aft of the vehicle. The housing 4 has limited sliding movement in said lower portion in a direction crossways of the vehicle. The upper portion 6a of said universal bearing being at right angles to said lower or housing encircling portion 6 and in alignment with the connecting beams 5. The ends 29 of the beams 5 are in the form of hollow shafts capable of being rotatably secured in said upper portions 6a of the universal bearing.

Extending crossways of the vehicle below the centre of each connecting beam 5 and the springs 1 at the same side of the vehicle as the beam, is a plate 7 which is secured to the beam 5, preferably by welding, and carries bearings 8 for a hollow cross shaft 9, the latter also passing through a bearing 5a in the beam 5 and being closed at its ends by removable caps or plugs 9a.

Each hollow shaft 9 is secured to the springs 1 beneath which it is located by U bolts 10 which pass around said shaft and have their ends secured in plates 11 above the springs 1, by means of nuts 12, whereby said shaft 9 and springs 1 are enabled to be securely clamped together.

Torque rods 13 with a ball and socket coupling 14 at each end and supported by springs 15 at each end of the rods, are fitted between brackets 16 on the front housing 4 and extensions of the spring clamping plates 11, while a torque tube 17 is provided between the front and rear housings 4, as follows:—

The tube 17 (Figure 4) houses the drive shaft 18 between the differential gears of the two axles, said shaft 18 being telescopic with a spline fitting at 18a to permit lengthening and shortening of the shaft under varying positions of the axles.

At its forward end the torque tube 17, which is also telescopic, is connected by a ball and socket coupling 19 with the differential casing 20 of the front housing 4, while a coupling 21 comprising an integral with the differential casing 22 of the rear housing 4, and a portion forming part of the tube 17, connects the rear end of the tube to said rear housing, the pivotal axis 23 between the two portions of the coupling 21 being vertical, so that there can be side movement only between the rear end of the tube 17 and the rear housing 4.

The couplings 19 and 21 accommodate the universal joints 24 of the drive shaft 18.

The torque rods 13 and the torque tube 17 prevent turning of the housings 4 about their horizontal axes, while maintaining the axles horizontal and allowing full lift on the double bearings between the housings 4 and the end of the connecting beams 5. The distance between the ends of the rods attached to the forward housing 4 is greater than the distance between the ends of said rods attached to the plates 11, in order to provide ample clearance between said rods and the inner springs 1 upon either of the forward wheels lifting.

Lubrication of the various bearings is provided for by utilizing the hollow cross shafts 9 as lubricant reservoirs, and equipping them with plungers 25, the rods 26 of which extend through a cap or plug 9a and are provided with operating handles externally of the latter.

Each shaft 9 contains ducts 27 leading to the bearings 8 and 5a and also has leading therefrom through the beam 5, further passages 28 which open into the hollow shaft ends 29, the latter containing perforations 30 which open into the upper portion 6a of the universal bearing, while the lower portion 6 of the latter surrounding the housing 4, is connected with the upper portion by passages 31.

With the hollow shafts 9 charged with lubricant, the latter can be forced to each of the seven bearings in communication with a particular shaft reservoir 9 merely by operating the plunger 25 in the latter.

Instead of forming the universal bearing with the portion 6a which receives the shaft 29 of the connecting beam 5, above the portion 6 which receives the housing 4, the positions of said portions 6a and 6 can be reversed, in order to provide for underslinging the chassis, as is desirable with heavy vehicles.

What I do claim and desire to obtain by Letters Patent of the United States of America is:—

1. A mounting for power driven wheels comprising a frame, a plurality of pairs of leaf springs, one secured on each side of the frame to the frame, a pair of spaced axles, axle housings for enclosing the axles, a plurality of wheels secured to the ends of the axles, connecting beams below the frame and at right angles with the axle housings and between the members of each pair of leaf springs, for connecting the axle housings, universal bearings at the ends of the connecting beams for connecting the beams to the axle housings, said universal bearings comprising two portions at right angles to each other whereby the housings can have sliding movement, both the beams and the axle housings being rotatably mounted in the universal bearings, collars on the axle housings to limit the sliding movement of the axle housings at right angles to the connecting beams in the universal bearings, cross shafts at right angles to the length of the leaf springs, bearings for carrying the cross shafts at the ends of the shafts, plates secured to the centers of the connecting beams for carrying said bearings, bearings in the centers of the connecting beams also carrying the cross shafts, and means for securing the cross shafts to the centers of the pairs of leaf springs.

2. A mounting as claimed in claim 1 comprising torque rods, ball and socket couplings at each end of the torque rods, means for securing one end of the torque rods to the central parts of the leaf springs, a member affixed to said forward axle housing for securing the other end of the said torque rods.

3. A mounting as claimed in claim 1 comprising a drive shaft between the axles, differential gearings for transmitting the power from the drive shaft to the axles, a telescopic torque tube between the axle housings enclosing the drive shaft, a ball and socket joint for securing the torque tube to the forward axle housing and a hinged joint for securing the torque tube to the rear axle housing.

4. A mounting as claimed in claim 1 wherein, a drive shaft operatively connected to each axle, said driveshaft being fitted with a spline fitting to make said drive shaft telescopic.

RICHARD WHITFORD.